US007899188B2

(12) United States Patent
Abu-Amara (10) Patent No.: US 7,899,188 B2
(45) Date of Patent: Mar. 1, 2011

(54) METHOD AND SYSTEM TO AUTHENTICATE A PEER IN A PEER-TO-PEER NETWORK

(75) Inventor: Hosame H. Abu-Amara, Round Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 732 days.

(21) Appl. No.: 11/756,371

(22) Filed: May 31, 2007

(65) Prior Publication Data

US 2008/0298579 A1    Dec. 4, 2008

(51) Int. Cl.
*H04L 9/08* (2006.01)
(52) U.S. Cl. .................. 380/282; 380/279; 380/278
(58) Field of Classification Search .............. 380/282, 380/279, 278
See application file for complete search history.

(56) References Cited

U.S. PATENT DOCUMENTS

| | | | | |
|---|---|---|---|---|
| 6,061,794 | A * | 5/2000 | Angelo et al. ................ 726/3 |
| 7,065,579 | B2 * | 6/2006 | Traversat et al. ............ 709/230 |
| 7,206,934 | B2 * | 4/2007 | Pabla et al. ................ 713/168 |
| 2003/0028484 | A1 | 2/2003 | Boylan et al. |
| 2003/0229789 | A1 | 12/2003 | Morais et al. |
| 2004/0019786 | A1 | 1/2004 | Zorn et al. |
| 2005/0149723 | A1 | 7/2005 | Watkins et al. |
| 2005/0152305 | A1 | 7/2005 | Ji et al. |
| 2005/0152396 | A1 | 7/2005 | Pichna et al. |
| 2005/0153725 | A1 | 7/2005 | Naghian et al. |
| 2005/0154889 | A1 | 7/2005 | Ashley et al. |
| 2005/0267991 | A1 | 12/2005 | Huitema et al. |

OTHER PUBLICATIONS (Couch) Peer-to-Peer File-Sharing Networks: Security Risks; William Couch; as published by SANS Institute in year 2002.*
(Mills) CNET News; Security; Mar. 6, 2009 11:00 AM PST; Can peer-to-peer coexist with network security?; Elinor Mills; published in year 2009.*
(Li) A Survey of Peer-to-Peer Network Security Issues; James Li; as printed in 2010.*
(Bradley) Peer-to-Peer (P2P) Networking Security; Four Steps to Sharing and Swapping Files Without Becoming a Victim; about.com; Tony Bradley; printed out in year 2010.*
Patent Cooperation Treaty, "International Search Report and Written Opinion", ISA/EP, by Officer Liebhardt, Ingo, in PCT Application No. PCT/US2008/064833; Document of 12 pages dated Aug. 12, 2009.
Schneier, B., "Applied Cyrptography", Second Edition, Protocols, Algorithms, and Source Code in C, 1996, John Wiley & Sons, Inc., New York 218930, XPOO2503291, p. 30, line 15—p. 31, line 8 and p. 503, line 1—p. 507, line 5.

(Continued)

*Primary Examiner* — David Y Jung
(74) *Attorney, Agent, or Firm* — Guntin Meles & Gust, PLC; Pablo Meles, Esq.

(57) ABSTRACT

A system (100) and method (500) system to authenticate a peer in a peer-to-peer network is provided. The system can include a first peer (110) to locally create a secret key (112) and use the secret key to produce a public-key pair (120) comprising an identifier name (113) and a small public-key (115), and a second peer (160) to locally authenticate the identifier name of the public-key pair by requesting (405) the first peer to produce a unique dataset that does not reveal the secret-key and yet validates that the public-key pair was generated with the secret-key when the large public-key is applied to a portion of the unique dataset without using an external authentication system.

20 Claims, 4 Drawing Sheets

OTHER PUBLICATIONS

Menezes, A.J., "Handbook of Applied Cryptography" 1997, CRC Press, Boca Raton 228210, XP002503292, pp. 405-412.

Vivek Haldar, "Zero Knowledge Cryptography", Mar. 8, 2002, 52 pages.

Wikipedia, "Feige-Fiat-Shamir Identification Scheme", May 3, 2007, 2 pages article. Http://en.wikipedia.org/wiki/Feige-Fiat-Shamir_Identification_Scheme. Web site last visited May 31, 2007.

Wikipedia, "ID-Based Cryptography", Jun. 22, 2006, 2 pages article. Http://en.wikipedia.org/wiki/ Cocks_Identity_Based_Encryption. Web site last visited Jul. 12, 2006.

Wikipedia, "Zero-Knowledge Password Proof", May 31, 2007, 2 pages article. Http://en.wikipedia.org/wiki/Zero-knowledge_password_proof. Web site last visited May 31, 2007.

Wikipedia, "Zero-Knowledge Proof", May 26, 2007, 6 pages article. Http://en.wikipedia.org/wiki/Zero-knowledge_proof. Web site last visited May 31, 2007.

S. Cheshire, et al.; "Dynamic Configuration of IPv4 Link-Local Addresses"; Network Working Group, Request for Comments 3927, Standards Track; May 2005; pp. 1-34; http://tools.ietf.org/html/rfc3927.

S. Thomson and T. Narten; "IPv6 Stateless Address Autoconfiguration"; Network Working Group, Request for Comments 2462, Standards Track; Dec. 1998; pp. 1-26; http://tools.ietf.org/html/rfc2462.

T. Narten and R. Draves; "Privacy Extensions for Stateless Address Autoconfiguration in IPv6"; Network Working Group, Request for Comments 3041, Standards Track; Jan. 2001; pp. 1-18; http://tools.ietf.org/search/rfc3041.

\* cited by examiner

| | |
|---|---|
| Peer 1 chooses an arbitrary number at least K bits in length that is called the identifier_secret | —202 |
| Peer 1 applies a modulus operator to the identifier_secret to produce identifier_public_large | —204 |
| Peer 1 performs a hash of the identifier_public_large to produce identifier_public | —206 |
| Peer 1 reveals a public-key pair <identifier_name, identifier_public> | —208 |

METHOD AND SYSTEM TO AUTHENTICATE A PEER IN A PEER-TO-PEER NETWORK

FIELD OF THE INVENTION

The present invention relates to computer and telecommunication network security, and, more particularly, to mobile devices and, more particularly, to a method and system for authenticating a peer in a peer-to-peer network.

BACKGROUND

In a peer-to-peer network, a peer can identify himself or herself by an identifier name. The identifier name allows other peers to contact the peer, and it also allows the other peers to know with whom they are communicating. However, in a large peer-to-peer network there can be multiple peers that use the same identifier name. In such cases, it can be difficult to ensure that identifier name in the peer-to-peer network is unique to the peer. Moreover, when exchanging secure information and sharing proprietary data among peers, it is important to validate with whom the peer is communicating.

SUMMARY

In one embodiment of the present disclosure, a method to generate a public-key pair for an identifier-name i of a peer is provided. The method can include choosing a secret-key, s, applying a modulus operator to the secret-key to produce a large public-key, v, performing a hash of the large public-key to produce a small public-key, hv, combining the identifier name with the small public-key to produce a public-key pair <i, hv>, and sharing the public-key pair in a peer-to-peer network. The steps of choosing, applying, performing, and combining can occur locally in the peer without use of or in disassociation with an external authentication system. The modulus operator can be $v=s^2 \mod n$, where n is a value that is commonly shared among peers in the peer-to-peer network. The term n can be preconfigured in the peer. The term n can be a product (n1*n2) of two prime numbers, where an administrator of the peer-to-peer network chooses the two prime numbers and then keeps secret from all peers in the network. In one arrangement, s and n are both the same length, and the hash of v produces a small public-key hv that has a length less than s and n.

In a second embodiment of the present disclosure, a method to authenticate an identifier-name of a first peer in a peer-to-per network by a second peer is provided. The method can include receiving a public-key pair <i, hv> comprising the identifier name i and a small public-key hv locally created by the first peer using a secret key that is held in confidence by the first peer, and locally authenticating the identifier name i by requesting the first peer to produce a unique data set, and comparing the unique data set to a second unique data set generated by the second peer from a portion of the produced unique data set using the modulus operator v, wherein the authenticating is disassociated with an external authentication system.

The method can include choosing a secret-key, s, applying a modulus operator [$s^2 \mod n$] to the secret-key to produce a large public-key, v, performing a hash of the large public-key to produce the small public-key, $hv=hash\ [s^2 \mod n]$, and combining the identifier name with the small public-key to produce the public-key pair <i, hv>, where n is a value that is known to the first peer (Peer 1) and the second peer (Peer 2) and is a product of two prime numbers, and the steps of choosing, applying, performing, and combining occur locally without use of an external authentication system. The method can include receiving from Peer 1 a unique data set [$(ri)^2 \mod n$] using random numbers r1, r2, . . . , ri for i=1 to k, where k is a parameter chosen by Peer 2, informing Peer 1 of a first selected subset r'i and a second selected subset r"i of the unique data set, receiving from Peer 1 a first reply $xi=([s*ri] \mod n)$ for each $ri^2 \mod n$ of the first selected subset, ri, receiving from Peer 1 a second reply $yi=(ri \mod n)$ for each $ri^2 \mod n$ of the second selected subset, r"i, and validating the identifier name if $([v*r'i^2] \mod n)$ equals $xi^2 \mod n$, and if $(r"i^2 \mod n)$ equals $yi^2 \mod n$. The method can authenticate a peer without accessing a Public-key Infrastructure (PKI) that issues PKI certificates, a remote authentication server that digitally verifies signatures, or a remote log-in server that ensures a uniqueness of an identifier.

In a third embodiment of the present disclosure, a system to authenticate a peer in a peer-to-peer network is provided. The system can include a first peer to locally create a secret key, s, and use the secret key to produce a public-key pair <i, hv> comprising an identifier name, i, and a small public-key, hv, and a second peer to locally authenticate the identifier name of the public-key pair by requesting the first peer to produce a unique dataset that does not reveal the secret-key and yet validates that the public-key pair was generated with the secret-key when the large public-key is applied to a portion of the unique dataset without using an external authentication system.

The second peer can request the first peer to generate the unique data from a sequence of random numbers, select a first subset and a second subset of the unique data set responsive to receiving the unique data set from the first peer, and inform the first peer of the first subset selected and the second subset selected. Upon the first peer processing the first subset with the secret-key to produce a first reply, the second peer can square the first reply to produce a first squared reply. Upon the first peer processing the second subset without the secret-key to produce a second reply, the second peer can square the second reply to produce a second squared reply. The second peer can then process the first subset of the unique data set with the large public-key to produce a first reference, process the second subset of the unique data set without the large public-key to produce a second reference, and validate the identifier-name of the first peer if the first squared reply equals the first reference and the second squared reply equals the second reference.

The first peer can apply a modulus operator to the secret key, s, to produce a large public-key, v, perform a hash of the large public-key to produce the small public-key, hv, and combine the identifier name with the small public-key to produce the public-key pair <i, hv>, wherein the steps of choosing, applying, performing, and combining occur locally in the peer without use of an external authentication system. The modulus operator can be $v=s^2 \mod n$, where n is preconfigured in Peer 1, and n is shared with Peer 2. The term n is a product (n1*n2) of two primes, where an administrator of the peer-to-peer network chooses the two prime numbers and then keeps the two prime numbers secret from all peers in the network. In a first level of authentication, Peer 2 can request Peer 1 to send a large public-key and check if a hash of the large public-key matches the short public-key. In a second level of authentication, Peer 2 can request Peer 1 to generate k random numbers, r1, r2, . . . , ri for i=1 to k, and send the unique data set $(ri^2) \mod n$ to Peer 2. Peer 2 can receive the unique data set, select a first subset and a second subset of the unique data set, and inform Peer 1 of the first and second subset selected. In response, Peer 1 can send $(s*ri) \mod (n)$ to Peer 2 for each $ri^2$ of the first subset as a first reply, and also send (ri) mod (n) to Peer 2 for each $ri^2$ of the second subset as a second reply. Peer 2 can validate the identifier-name if a square of the first reply is equal to $(v*ri^2)$ mod (n) for each $ri^2$ in the first reply, and a square of the second reply is equal to $ri^2$ mod (n) for each $ri^2$ in the second reply.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "processor" can be defined as number of suitable processors, controllers, units, or the like that carry out a pre-programmed or programmed set of instructions. The terms "program," "software application," and the like as used herein, are defined as a sequence of instructions designed for execution on a computer system. Further note, the term "exemplary" is used herein to mean "serving as an example, instance, or illustration." Any embodiment or design described herein as "exemplary" is not necessarily to be construed as preferred or advantageous over other embodiments or designs.

Figure 1:
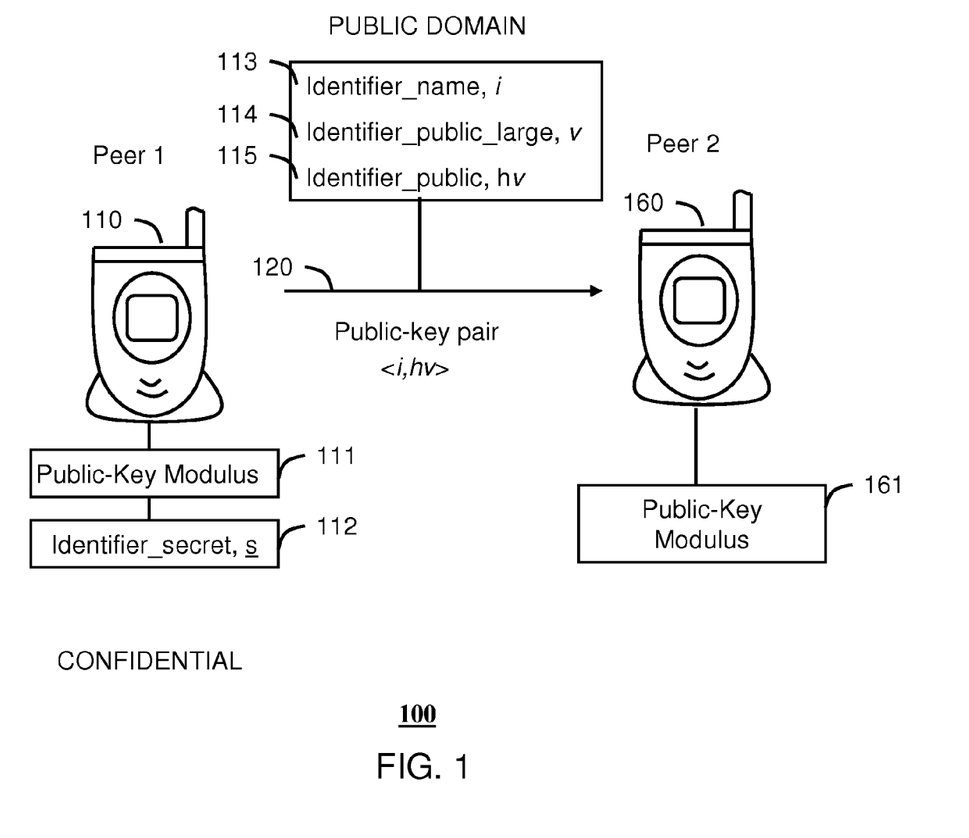
FIG. 1 depicts an exemplary Peer to Peer (P2P) network in accordance with an embodiment of the present invention.

Referring to FIG. 1, an exemplary peer-to-peer (P2P) network 100 for peer authentication is shown. The P2P network 100 can include a first peer 110 and a second peer 160 that communicate with one another, or other peers, for example using one or more wired (e.g. Ethernet, cable, PSTN etc.) or wireless technologies (e.g. CDMA, OFDM, IEEE 802.x, WiMAX, WiFi, etc). The P2P network 100 can include more than the number of peers shown, which may be present in various device forms. For example, a peer can be a cell phone, personal digital assistant, desktop personal computer, laptop, portable music player, or any other suitable communication device. Each peer in the P2P network can have an identifier name. For example, peer 110 can have an identifier name 113 that other peers in P2P network 100, such as peer 160, use to contact peer 110. Peers in the P2P network 100 can also assume multiple identifier names, or aliases, which can be used for different applications (e.g. friend list, business contact, game player name, etc.). The identifier name 113 can be combined with a public identifier (e.g. identifier_public 115) to generate a unique public-key pair 120. The public-key pair 120 can ensure that each peer in the P2P network can be distinguished from other peers.

In the P2P network, and in accordance with the embodiments herein presented, a peer can authenticate the identifier name of another peer using local authentication. More specifically, as shown in FIG. 1, peer 160 can authenticate an identity of peer 110 directly in a peer to peer arrangement without consulting or utilizing an external authorization system, such as Public-key Infrastructure (PKI) system. That is, peers can authenticate one another directly without accessing an authorization server.

Broadly stated, peer 160 can authenticate the identifier name 113 of peer 110 by a series of steps which validates that peer 110 holds the secret key 112 used to generate the public-key pair 120. As part of the authentication, peer 160 challenges peer 110 to use the secret key 112 to compute a value. Though peer 160 does not know the secret-key 112, nor can peer 160 directly verify the value computed by peer 110, peer 160 can use the value computed by peer 110 with a hash available to both peer 110 and peer 160 to validate the public-key pair 120 presented by peer 1, thereby confirming that peer 110 holds the secret-key 112 and is the identified peer claimed in the public-key pair 120. More specifically, peer 160 requests peer 110 to encrypt a series of randomly chosen values that do not reveal peer 110's secret-key 112, but yet verify the identify of peer 110, as will be discussed ahead.

The local authentication assumes that all peers in the P2P network 100 have a preconfigured public-key modulus. The public-key modulus, n, is a product of two prime numbers chosen by an administrator of the peer-to-peer network, where the two prime numbers are kept secret by the administrator and not revealed to the peers in the network. In one embodiment, all the public-key moduli in the peers have the same value n. For example, peer 110 can include a public-key modulus 111 *n*, and peer 160 can also include the same public-key modulus 161 *n*. When n is at least 1023 bits in length, there is no known method to compromise the cryptographic operations we discuss in this disclosure. In another embodiment, the public-key moduli in the peers have different values. For example, peer 110 can include a public-key modulus 111 that is different from the public-key modulus 161 in peer 160. As long as all public-key moduli are at least 1023 bits in length, there is no known method to compromise the cryptographic operations we discuss in this disclosure. It is not necessary for the public-key moduli to be kept secret; only the primes whose product produces the public-key moduli can be kept secret by the entity that creates the public-key moduli, for example the administrator of the peer-to-peer network. For the embodiment in which the public-key moduli in the peers have different values, it would be necessary for peers to inform each other of the public-key moduli they use. This can be done by the peers sending their public-key moduli directly to other peers, or can be done by attaching the public-key moduli they use to the identifier_name 113.

Figure 2:
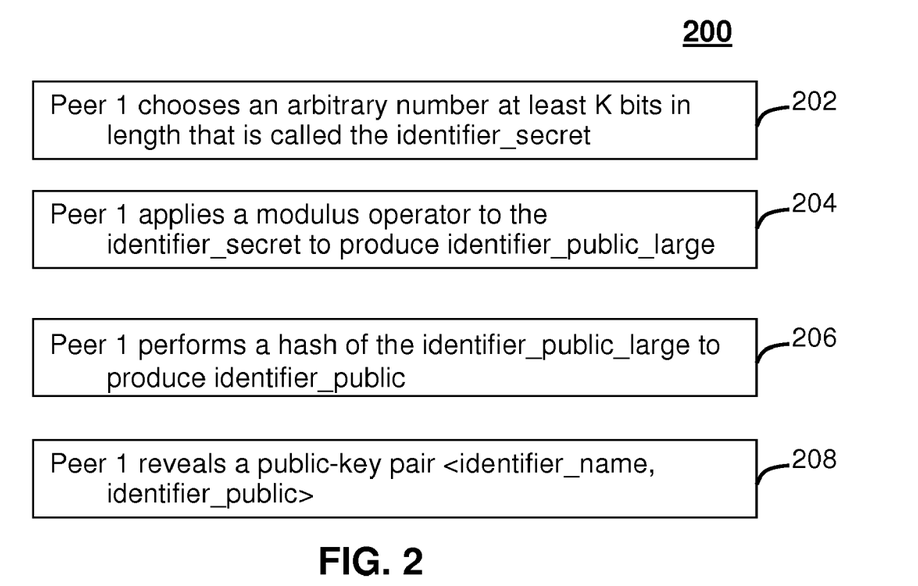
FIG. 2 depicts an exemplary method operating in the P2P network in accordance with an embodiment of the present invention.
Figure 3:
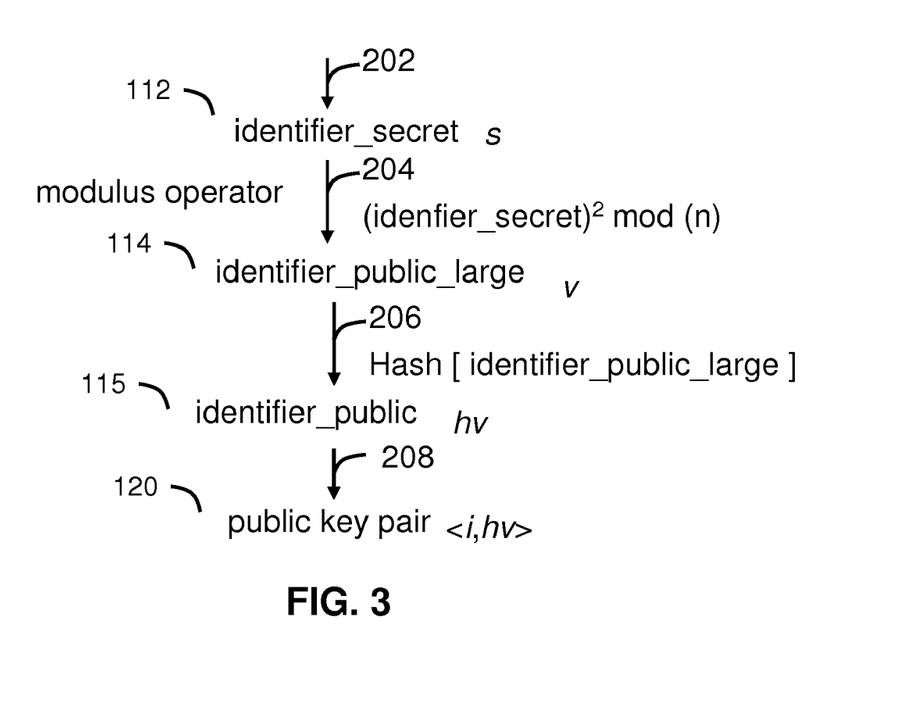
FIG. 3 depicts a portion of the method 200 in accordance with an embodiment of the present invention.

Each peer in the P2P network can create a secret key, s, 112 that is held in confidence by the peer. The secret key 112 can be used to generate the public-key pair 120 that is publicly shared with other peers in the P2P network. The public-key pair 120 can be used by other peers in the network to validate an identify of the peer corresponding to the public-key pair 120. For example, peer 110 can locally create the identifier name 113 (e.g. also called identifier_name) and locally create the secret key 112 (e.g. also called identifier_secret). From the secret key 112, peer 110 can locally generate a large public identifier 114, v, that is then cryptographically hashed to produce a small public-key 115 (e.g. also called identifier_public, hv). Peer 110 then combines the identifier_name 113, i, with the small public-key 115, hv, to produce the unique public-key pair <i,hv> 120. The public-key pair 120 is made public to peers such as peer 160 in the P2P network, which can then verify the identify of peer 110 in accordance with the methods herein set forth. In the current illustration, peer 160 authenticates peer 110 from the public-key pair 120 by requesting the peer 110 to produce a unique data set using the secret key 112, and comparing the unique data set to a second unique data generated by peer 160 from a portion of the produced unique data set using the modulus operator, v 114. This allows peer 160 to verify the identifier name of the peer 110 without using an external authentication system Referring to FIG. 2, an exemplary method 200 for locally creating the public-key pair 120 is shown. In the current description, exemplary method 200 is implemented by peer 1, though it can be performed by any other peers creating an identifier name. It should also be noted, that the exemplary method 200 can be performed each time peer 110 creates a new identifier name, such as an alias. This allows peer 110 to create multiple identifier names that can be authenticated for varying purposes. For example, peer 110 may have a first identifier name for a first peer group (e.g. friends), and a second identifier name for a second peer group (e.g. business). Upon completion of the exemplary method 200, each identifier name created by peer 110 can correspond to a unique public-key pair 120 that can be authenticated by another peer to validate an identity of the peer claiming the identifier name in the public-key pair. Briefly, FIG. 3 presents an exemplary depiction of the method steps of exemplary method 200.

At step 202, peer 110 chooses an arbitrary number that is called the identifier_secret 112 which is at least K bits in length. The identifier_secret is held in confidence by peer 110 and is not shared with any other peers; that is, it is secret and not revealed to other peers. The number of bits K equals the number of bits of n, wherein n is the public-key modulus 111 of the peer. For example, if the peers in the P2P network 100 use 1023 bits for n, then K is also 1023 bits in length.

At step 204, peer 110 applies a modulus operator to the identifier_secret 112 to produce identifier_public_large 114. The modulus operator is a mathematical operation defined as $x^2$ mod n, wherein x is the identifier_secret 112 and n is the public-key modulus 111. More specifically identifier_public_large=(identifier_secret)$^2$ mod n, where n corresponds to the value of the public-key modulus that is preconfigured in peer 110. Identifier_public_large 114 is a large public-key that can be used by other peers in the P2P network as a first level of authentication. It is large in the sense that identifier_public_large 114 requires a large number of bits to represent.

At step 206, peer 110 performs a cryptographic hash of the identifier_public_large 114 to produce identifier_public 115. The cryptographic hash is a hashing function that maps the larger value associated identifier_public_large 114 to a smaller value associated with identifier_public 115. Examples of cryptographic hashes include the well-known hash algorithms HMAC and SHA-1. The smaller public-key 115 can be more efficiently communicated in the P2P network 100 than the larger public-key 114. The hashing function is a reproducible method of representing identifier_public_large 114 as identifier_public 115 which serves as a "fingerprint" to the larger identifier_public_large 114. In one embodiment, the hashing function can hash the 1023 bit identifier_public_large 114 (i.e. large public-key) to a 60 bit identifier_public 115 (i.e. small public-key), thereby reducing the amount of data required to represent the large public-key. Each consecutive group of 6 bits in the hash-value (i.e. identifier_public 115) can be represented by a single alphanumeric character (e.g. letter, character, digit) thus producing a small public-key (i.e. identifier_public 115) consisting of 10 characters (e.g. E678943T2U). In such regard, the identifier_public 115 can be more easily recognized than a 60 bit binary number.

At step 208, peer 110 reveals a public-key pair 120 <identifier_name, identifier_public> consisting of the chosen identifier_name 113 and the small public-key 115 (e.g. identifier_public). As an example, the identifier_name 113 can be a sequence of digits and letters (e.g. "Alice") chosen by peer 1, and the identifier_public 115 can be the 10 character sequence (e.g. E678943T2U) produced from the hash. The public-key pair 120 can thus be represented by <Alice, E678943T2U> and shared amongst peers in the PTP network 100. For example, the public-key pair 120 can be presented by peer 110 when contacting peer 160 to allow peer 160 to validate the identity (e.g. identifier_name) of peer 110. In particular, peer 160 can use the public-key pair 120 as a first level of authenticating the identity of peer 1.

It should be noted that the exemplary method 200 can be practiced locally (e.g. on the device) at peer 110 without the use of an external authentication system (such as those using public-key infrastructure (PKI) techniques, where the keys to be communicated can be hundreds of bits in length). It should also be noted that the method steps 202 to 206 can be implemented locally by a processor (e.g. micro-controller, microprocessor, digital signal processor DSP, integrated circuit, etc. of peer 110) to generate identifier_name 113, identifier_public 115, and identifier_public_large 114. Peer 110 keeps the value of identifier_name 113, and the cryptographic values of identifier_secret 112, identifier_public_large 114, and identifier_public 115 local to the device, for example, by storing the values in a programmable memory.

Figure 4:
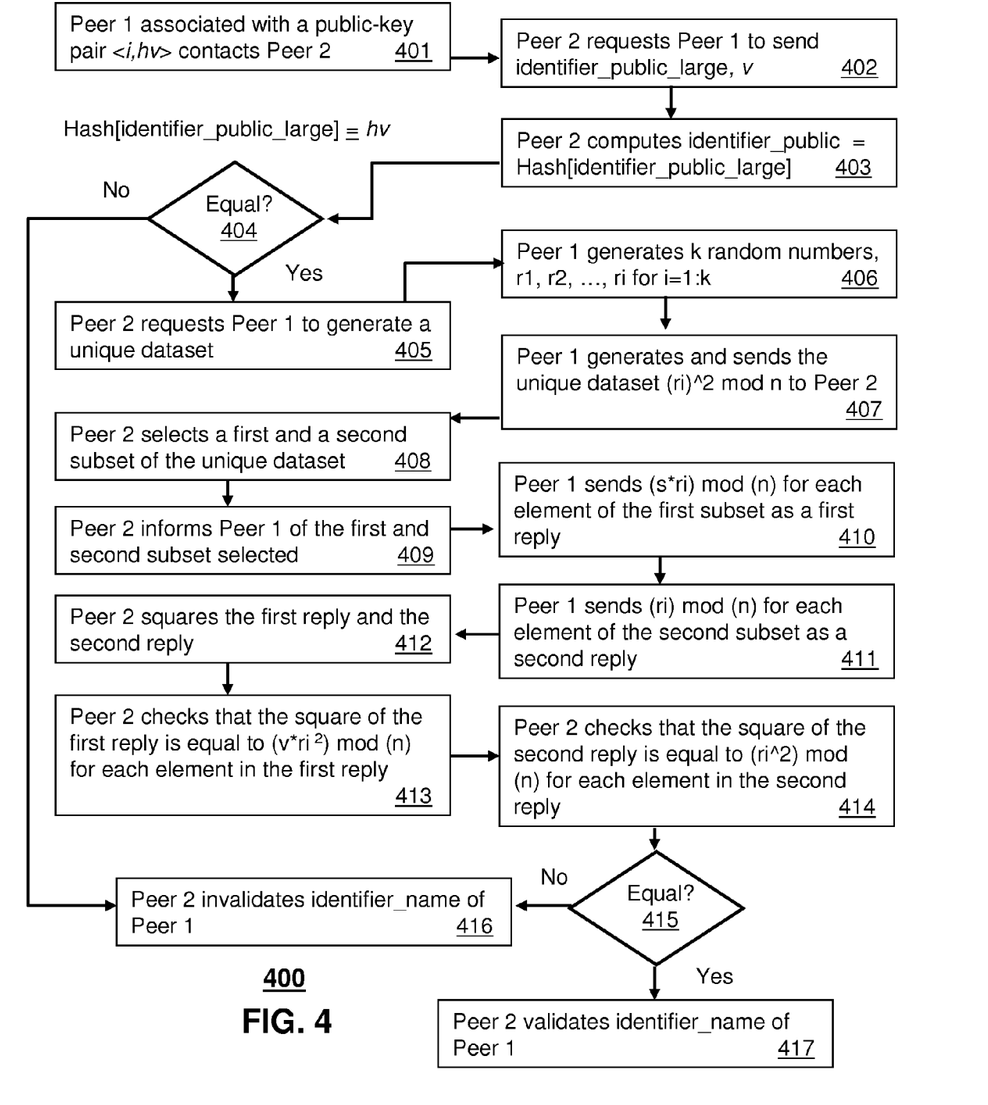
FIG. 4 depicts an exemplary flowchart for peer authentication in the P2P network in accordance with an embodiment of the present invention.

Referring to FIG. 4, an exemplary flowchart 400 for authenticating a first peer in a peer-to-peer network by a second peer is shown. The flowchart 400 can be practiced with more or less than the number of steps shown, and is not limited to the order of the steps shown. To describe the flowchart 400, reference will be made to FIG. 1, although it is understood that the flowchart 400 can be implemented in any other manner using other suitable components. The exemplary flowchart 400 can start in a state wherein a first peer has created an identifier_name 113, identifier_secret 112, and a public-key pair 120 in accordance with the exemplary method 200 of FIG. 2.

At step 401, the first peer 110 associated with the public-key pair 120 contacts the second Peer 160. The public-key pair <i, hv> 120 includes the identifier name 113, i, claimed by peer 110 and the corresponding small public_key 115, hv. Recall the small public_key 115 hv was generated by peer 110 from the secret key, s, 112 held in confidence by peer 110 in accordance with the method steps 200 of FIGS. 2 and 3. The identifier_name 113 can be a user name that uses a combination of characters, letters, and digits (e.g. "Alice"). For example, peer 110 can contact peer 160 by sending a message request to initiate a data sharing session which includes the public-key pair 120 (e.g. <Alice, E678943T2U>) which identifies the peer 110 as "Alice" with the corresponding smaller public identifier key 115 (e.g. identifier_public). Notably, peer 110 keeps the larger identifier_public_large 114 (e.g. 1023 bit value) which requires more bandwidth to communicate than the smaller identifier_public 115 (e.g. 60 bit value), and which is made available on request.

Upon parsing the identifier name 113 from the public-key pair 120, the peer 160 can proceed to perform a first level of authentication. In particular, peer 160 can validate that the smaller received public-key 115 (e.g. identifier_public) corresponds to the larger public-key 114 (e.g. identifier_public_large) held by peer 1. To do so, peer 160 at step 402 requests peer 110 to send the larger public-key 114 (e.g. identifier_public_large). Upon receiving identifier_public_large 114 from peer 1, peer 160 proceeds to compute the cryptographic hash of identifier_public_large 114 as shown in step 403. The hash can be a hashing function such as a hash map or hash table that is available to all peers in the P2P network 100.

At step 404, peer 160 can determine if Hash[identifier_public_large] equals identifier_public 115. In particular, peer 160 can locally determine if the hash-value (e.g. 60 bit number) produced from the hashing of identifier_public_large 114 equals the value of the identifier_public 115 (e.g. 60 bit number) received earlier in the public-key pair 120. If the hash-value produced from the hashing operation does not match the public-key value 115 (e.g. identifier_public), peer 160 determines that the public-key pair 120 <i, hv> does not correspond to the identifier_name, i, 113 claimed in the public-key pair <i, hv>. Accordingly, peer 160 invalidates the identity of peer 110 at step 416.

If the hash-value produced from the hashing operation does match the public-key value 115 (e.g. identifier_public), peer 160 proceeds to a second level of authentication. At step 405, peer 160 requests peer 110 to generate a random dataset. In response, at step 406, peer 110 generates k random numbers, $r_1, r_2, \ldots, r_i$ for i=1:k, where k is an integer that is preferably larger than 30. Peer 110 keeps that k random numbers secret. For each, $r_i$, peer 110 at step 407 generates the unique data set $(r_i)^2$ mod n, where n is the public-key modulus 111. The unique data set contains k elements that are sent by peer 110 to peer 160.

Upon receiving the unique data set from peer 1, peer 160 selects a first subset and a second subset from the unique dataset. At step 408, peer 160 chooses a random subset of the received k values, and informs peer 110 at step 409 of the first subset and second subset selected. The subset identifies the random values selected for the particular subset. For example, peer 160 can select the indexes (e.g. 1-5, 7, 13-16, and 25-30) of the unique dataset for identifying the first subset (e.g. corresponding to random numbers $r_{1-5}, r_7, r_{13-16},$ and $r_{25-30}$) and the indexes (e.g. 6, 8-12, and 17-24) for identifying the second subset (e.g. corresponding to random numbers $r_6, r_{8-12},$ and $r_{17-24}$) and report the indexes to peer 1. In response to peer 110 receiving from peer 160 the indication of the first subset and the second subset, peer 110 can perform a first modulus operation on the random values of the first subset, and a second modulus operation on the random values of the second subset.

The first modulus operation includes the secret-key 112. In particular, peer 110 computes (identifier_secret*$r_i$,) mod (n) for each element (e.g. $r_i^2$) of the first subset and sends the computed values as a first reply at step 410. Notably, peer 110 uses the secret-key 112 (e.g. identifier_secret) which is held in confidence by peer 110 as a multiplier term to the random value to produce the values of the first reply.

The second modulus operation does not include the secret key 112. In particular, peer 110 computes ($r_i^1$) mod (n) for each element (e.g. $r_i^2$) of the second subset and sends the computed values as a second reply at step 411. Notably, peer 110 does not include a multiplication of the secret-key 112, or apply a squaring function, to each random value of the second subset.

At step 412, peer 160 responsive to receiving the first reply and the second reply squares the first reply mod n to produce a first comparison set (e.g. ([s*$r'_i$] mod n)$^2$ mod n) and squares the second reply mod n to produce a second comparison set (e.g. ($r''_i$ mod n)$^2$ mod n). At step 413, peer 160 checks that each element of the first comparison set is equal to each element received in the first subset of the unique dataset multiplied by the modulus operator, v, mod n (e.g. ([s*$r'_i$] mod n)$^2$ mod n==[(v) ($r_i$)$^2$] mod (n)). Notably, peer 160 incorporates the modulus operator, v, which uses the secret-key 112 (see FIG. 3). That is, the secret key 112 used by peer 110 to create the modulus operator 114, is constructively associated with the modulus operator 114, which is used by peer 160 as a first step to validate that peer 110 holds the secret-key 112.

At step 414, peer 160 checks that each element of the second comparison set is equal to each element received in the second subset of the unique dataset (e.g. ($r''_i$ mod n)$^2$ mod (n)==($r_i$)$^2$ mod (n)). Notably, peer 160 does not incorporate a multiplicative term associated with the secret-key 112. Since the first subset and the second subset were selected randomly from a unique dataset, the second comparison set must also match the second subset of the unique dataset. The second subset provides a second validation that peer 110 holds the secret-key 112.

If at step 415 the square of the first reply mod n is equal to [[(v) ($r_i$)$^2$] mod (n)] (i.e. step 413) and the square of the second reply mod n is equal to [($r_i$)$^2$ mod (n)] (i.e. step 414), peer 160 validates the identifier_name, i, of peer 110 contained in the public-key pair <i, hv> as shown in step 417. If not, peer 160 invalidates the identifier_name of peer 110 at step 416. The flowchart 400 can be performed locally between peers for authenticating an identify of a peer. Upon a second peer authenticating a first peer, the peers can proceed to communicate.

Figure 5:
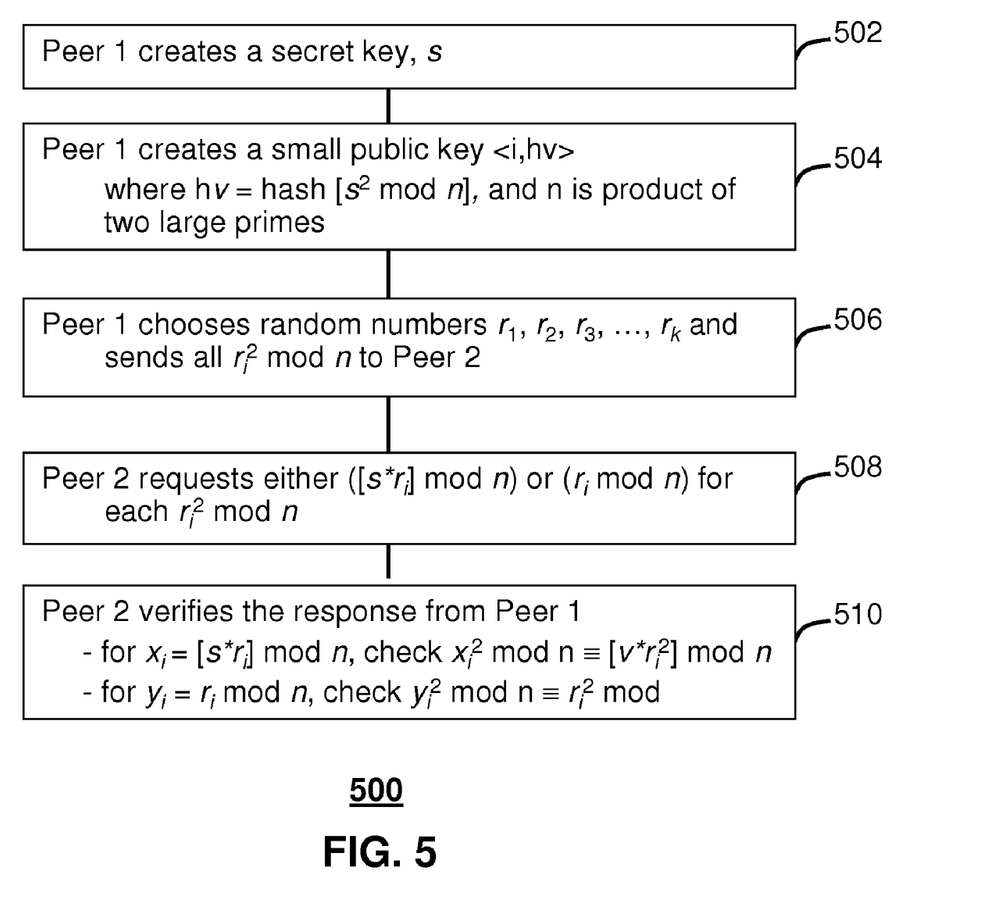
FIG. 5 depicts an exemplary method for peer authentication in the P2P network in accordance with an embodiment of the present invention.

Referring to FIG. 5, an exemplary method 500 that summarizes steps of flowchart 400 for authenticating an identify of a peer in the P2P network 100 is presented. Method 500 can be practiced with more or less than the number of steps shown, and is not limited to the order of the steps shown. Exemplary method 500 can begin in a state wherein a peer has created an identifier name.

At step 502, peer 110 creates the secret-key, s, 112 which is a number having a bit length K equal to a bit length of the public-key modulus n corresponding to peer 110. As an example, the secret key can be of length K=n=1023 bits. At step 504, peer 110 creates the public-key pair <i,hv> 120 that associates the identifier name, i, with a small public-key, hv. Peer 110 creates the small public-key 115 by performing a hash of a modulus operation of the secret key 112, hv=hash [$s^2$ mod n], where n is the public-key modulus common to peers in the P2P network 100, and $s^2$ mod n is the large public-key 114. As previously noted, n is the product of two large primes and can be 1023 bits. At step 506, peer 110 responsive to a challenge by peer 160 to validate the identify of peer 110 chooses random numbers r1, r2, r3, . . . , rk and sends all $ri^2$ mod n to Peer 160. Peer 160 receives the random numbers and selects a first subset and second subset of the random numbers. Peer 160 then informs peer 110 of the random numbers selected in each subset, and at step 508, requests peer 110 to send ([s*ri] mod n) for the first subset, and (ri mod n) for the second subset. Peer 110 then responds with a first reply of (xi=[s*ri] mod n) and a second reply of (yi=ri mod n). At step 510, peer 160 verifies that a square of the first reply $xi^2$ mod n is equal to $[v*(r_i)^2]$ mod n in a first comparison (e.g. for $xi=[s*r_i]$ mod n, check $xi^2$ mod n≡$[v*(r_i)^2]$ mod n), and that a square of the second reply $yi^2$ mod n is equal to $(r_i)^2$ mod n in a second comparison (e.g. for y=ri mod n, check $yi^2$ mod n≡$ri^2$ mod n). If the results of the first comparison are equal and the results of the second comparison are equal, peer 160 validates the identifier_name 113 of peer 110, thereby validating that peer 110 holds the secret-key 112 and that peer 110 is the identify presented in the identifier_name 113.

Upon reviewing the aforementioned embodiments, it would be evident to an artisan with ordinary skill in the art that said embodiments can be modified, reduced, or enhanced without departing from the scope and spirit of the claims described below. There are numerous configurations for peer to peer authentication that can be applied to the present disclosure without departing from the scope of the claims defined below. For example, the hash can include any number of bits greater or less than 60 bits. The hash can also depend on the number of active peers in the P2P network. Moreover, the method 500 can exclude the hash and produce a large public-key v=$s^2$ mod n without a hashing operation to produce the larger public-key pair <i, v>, instead of <i, hv>. As another example, the methods of peer authentication discussed herein can be applied to signature verification. These are but a few examples of modifications that can be applied to the present disclosure without departing from the scope of the claims stated below. Accordingly, the reader is directed to the claims section for a fuller understanding of the breadth and scope of the present disclosure.

Those skilled in the art will recognize that the present invention has been described in terms of exemplary embodiments that can be based upon use of programmed processors to implement functions such as those described in method 200, flowchart 400, and method 500. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using any suitable electronic storage medium such as for example disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The embodiments of the present invention, as described in embodiments herein, can be implemented using a programmed processor executing programming instructions that are broadly described above in flow chart form that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications, permutations and variations as fall within the scope of the appended claims.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention are not so limited. Numerous modifications, changes, variations, substitutions and equivalents will occur to those skilled in the art without departing from the spirit and scope of the present embodiments of the invention as defined by the appended claims.

What is claimed is:

1. A method to generate a public-key pair for an identifier-name i of a peer, comprising:
choosing a secret-key, s;
applying a modulus operator to the secret-key to produce a large public-key, v;
performing a hash of the large public-key to produce a small public-key, hv;
combining the identifier name with the small public-key to produce a public-key pair <i, hv>; and
sharing the public-key pair in a peer-to-peer network;
wherein the steps of choosing, applying, performing, and combining occur locally in the peer disassociated with an external authentication system.

2. The method of claim 1, wherein the modulus operator is v=$s^2$ mod n, where n is a value that is shared among peers in the peer-to-peer network.

3. The method of claim 2, wherein n is a product (n1*n2) of two prime numbers.

4. The method of claim 2, wherein s and n are both the same length, and the hash of v produces a small public-key hv that has a length less than s and n.

5. A method to authenticate an identifier-name of a first peer in a peer-to-peer network by a second peer, the method comprising:

receiving a public-key pair <i, hv> comprising the identifier name i and a small public-key hv locally created by the first peer using a secret key that is held in confidence by the first peer; and locally authenticating the identifier name i by requesting the first peer to produce a unique data set, and comparing the unique data set to a second unique data generated by the second peer from a portion of the produced unique data set using the modulus operator v, wherein the authenticating is disassociated with an external authentication system.

6. The method of claim 5, wherein the method further comprises the steps of:

choosing a secret-key, s;

applying a modulus operator $[s^2 \bmod n]$ to the secret-key to produce a large public-key, v;

performing a hash of the large public-key to produce the small public-key, $hv = hash[s^2 \bmod n]$; and combining the identifier name with the small public-key to produce the public-key pair <i, hv>, wherein n is a value that is known to the first peer and the second peer and is a product of two prime numbers, wherein the steps of choosing, applying, performing, and combining occur locally disassociated with an external authentication system.

7. The method of claim 5, wherein the method further comprises the steps of:

receiving from the first peer a unique data set $[(ri)^2 \bmod n]$ using random numbers r1, r2, ..., ri for i=1 to k;

informing the first peer of a first selected subset r'i and a second selected subset r"i of the unique data set;

receiving from the first peer a first reply $xi = ([s*ri] \bmod n)$ for each $ri^2 \bmod n$ of the first selected subset, r'i;

receiving from the first peer a second reply $yi = (ri \bmod n)$ for each $ri^2 \bmod n$ of the second selected subset, r"i; and validating the identifier name if $([v*r'i^2] \bmod n)$ equals $xi^2 \bmod n$, and if $(r"i^2 \bmod n)$ equals $yi^2 \bmod n$.

8. The method of claim 5, wherein the external authentication system is at least one among a Public-key Infrastructure (PKI) that issues PKI certificates, a remote authentication server that digitally verifies signatures, or a remote log-in server that ensures a uniqueness of an identifier.

9. A system to authenticate a peer in a peer-to-peer network, the system comprising:

a first peer to locally create a secret key, s, and use the secret key to produce a public-key pair <i, hv> comprising an identifier name, i, and a small public-key, hv; and a second peer to locally authenticate the identifier name of the public-key pair by requesting the first peer to produce a unique dataset that does not reveal the secret-key and yet validates that the public-key pair was generated with the secret-key when corresponding large public-key is applied to a portion of the unique dataset without using an external authentication system.

10. The system of claim 9, wherein the second peer requests the first peer to generate the unique data from a sequence of random numbers;

selects a first subset and a second subset of the unique data set responsive to receiving the unique data set from the first peer; and informs the first peer of the first subset selected and the second subset selected.

11. The system of claim 10, wherein the second peer receives the unique data set, selects a first subset and a second subset of the unique data set, and informs the first peer of the first and second subset selected.

12. The system of claim 11, wherein the first peer sends $(s*ri) \bmod (n)$ to the second peer for each $ri^2$ of the first subset as a first reply, and the first peer sends $(ri) \bmod (n)$ to the second peer for each $ri^2$ of the second subset as a second reply.

13. The system of claim 12, wherein the second peer validates the identifier-name if a square of the first reply is equal to $(v*ri) \bmod (n)$ for each $ri^2$ in the first reply, and a square of the second reply is equal to $ri^2 \bmod (n)$ for each $ri^2$ in the second reply.

14. The system of claim 10, wherein the second peer squares a first reply to produce a first squared reply responsive to the first peer processing the first subset with the secret-key to produce the first reply; and squares a second reply to produce a second squared reply responsive to first peer processing the second subset without the secret-key to produce the second reply.

15. The system of claim 14, wherein the second peer processes the first subset of the unique data set with the large public-key to produce a first reference, and processes the second subset of the unique data set without the large public-key to produce a second reference; and validates the identifier-name of the first peer if the first squared reply equals the first reference and the second squared reply equals the second reference.

16. The system of claim 9, wherein the first peer applies a modulus operator to the secret key, s, to produce a large public-key, v;

performs a hash of the large public-key to produce the small public-key, hv; and combines the identifier name with the small public-key to produce the public-key pair <i, hv>, wherein the steps of choosing, applying, performing, and combining occur locally in the peer without use of an external authentication system.

17. The system of claim 16, wherein the modulus operator is $v = s^2 \bmod n$.

18. The system of claim 17, wherein n is a product (n1*n2) of two primes, where n is preconfigured in the first peer, and n is shared with the second peer.

19. The system of claim 9, wherein the second peer requests the first peer to send a large public-key and checks if a hash of the large public-key matches the short public-key.

20. The system of claim 9, wherein the first peer generates k random numbers, r1, r2, ..., ri for i=1 to k, and sends the unique data set $(ri^2) \bmod n$ to the second peer.

* * * * *